US012811700B2

(12) United States Patent
Kovács et al.

(10) Patent No.: US 12,811,700 B2
(45) Date of Patent: Nov. 24, 2026

(54) CHANNEL STATE INFORMATION VALUES-BASED ESTIMATION OF REFERENCE SIGNAL RECEIVED POWER VALUES FOR WIRELESS NETWORKS

(71) Applicant: NOKIA TECHNOLOGIES OY, Espoo (FI)

(72) Inventors: István Zsolt Kovács, Aalborg (DK); Afef Feki, Sceaux (FR); Anna Pantelidou, Massy (FR); Muhammad Majid Butt, Palaiseau (FR); Melisa López, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 1046 days.

(21) Appl. No.: 17/996,188

(22) PCT Filed: Apr. 17, 2020

(86) PCT No.: PCT/EP2020/060801
§ 371 (c)(1),
(2) Date: Oct. 13, 2022

(87) PCT Pub. No.: WO2021/209145
PCT Pub. Date: Oct. 21, 2021

(65) Prior Publication Data
US 2023/0198640 A1 Jun. 22, 2023

(51) Int. Cl.
*H04B 17/318* (2015.01)
*H04B 17/24* (2015.01)
(Continued)

(52) U.S. Cl.
CPC ........... *H04B 17/328* (2023.05); *H04B 17/24* (2015.01); *H04B 17/26* (2015.01); *H04B 17/373* (2015.01)

(58) Field of Classification Search
CPC ..... H04W 24/10; H04W 24/08; H04W 24/02; H04W 52/42; H04W 52/0206;
(Continued)

(56) References Cited

U.S. PATENT DOCUMENTS

2013/0344816 A1* 12/2013 Niu ...................... H04B 17/318 455/226.1
2018/0219664 A1* 8/2018 Guo ...................... H04W 24/10
(Continued)

OTHER PUBLICATIONS

International Search Report and Written Opinion for International Application No. PCT/EP2020/060801, mailed on Dec. 22, 2020, 3 pages.

(Continued)

*Primary Examiner* — Un C Cho
*Assistant Examiner* — Rasha K Fayed
(74) *Attorney, Agent, or Firm* — Lippes Mathias LLP

(57) ABSTRACT

According to an example embodiment, an apparatus includes at least one processor; and at least one memory including computer program code; at least one memory and the computer program code configured to, with the at least one processor, cause the apparatus at least to: receive a plurality of channel state information (CSI) values reported by the user device; determine a plurality of estimated reference signal received power (RSRP) values that have been estimated based at least on the plurality of CSI values; and output a sequence of RSRP values, including at least the estimated RSRP values.

20 Claims, 7 Drawing Sheets

(51) Int. Cl.
*H04B 17/26* (2015.01)
*H04B 17/373* (2015.01)

(58) Field of Classification Search
CPC . H04W 72/12; H04W 72/1205; H04W 72/29; H04W 72/27; H04W 72/541; H04W 72/00; H04W 72/23; H04W 72/232; H04W 76/27; H04W 76/048; H04W 76/28; H04W 80/02; H04W 48/16; H04W 88/02; H04W 88/12; H04W 84/042; H04L 5/0053; H04L 5/0023; H04L 5/0048; H04L 5/005; H04L 5/0057; H04L 5/0094; H04L 5/0058; H04L 5/0051; H04L 5/0035; H04L 5/0096; H04L 5/0007; H04L 5/0032; H04L 5/0073; H04L 5/0037; H04L 43/16; H04L 25/0204; H04L 25/0226; H04L 1/0026; H04L 1/0027; H04L 1/0029; H04L 1/0094; Y02D 30/70; H04B 17/24; H04B 17/21; H04B 17/26; H04B 17/318; H04B 17/373; H04B 17/309; H04B 17/00; H04B 17/327; H04B 17/345; H04B 17/23; H04B 17/336; H04B 7/0626; H04B 7/0486; H04B 7/0632; H04B 7/0639; H04B 7/0417; H04B 7/024; H04B 7/063; H04B 7/06952; H04B 7/0413
See application file for complete search history.

(56) References Cited

U.S. PATENT DOCUMENTS

| | | | | |
|---|---|---|---|---|
| 2019/0253964 | A1* | 8/2019 | Li | H04L 5/0048 |
| 2019/0357057 | A1* | 11/2019 | Cirkic | H04B 17/382 |
| 2020/0028543 | A1* | 1/2020 | Ng | H04L 1/0077 |
| 2020/0343945 | A1* | 10/2020 | Stephenne | H04W 72/20 |
| 2021/0076241 | A1* | 3/2021 | Yang | H04W 72/0446 |
| 2021/0243622 | A1* | 8/2021 | Tekgul | H04B 7/0632 |
| 2021/0258063 | A1* | 8/2021 | Ottersten | H04B 7/06964 |
| 2021/0306895 | A1* | 9/2021 | Chen | G01S 5/0236 |
| 2021/0329546 | A1* | 10/2021 | Wang | H04L 5/001 |
| 2021/0351885 | A1* | 11/2021 | Chavva | G06N 3/04 |
| 2022/0052915 | A1* | 2/2022 | Estevez | H04L 67/1031 |
| 2022/0376827 | A1* | 11/2022 | Seo | H04L 1/1825 |

OTHER PUBLICATIONS

Björn Ekman; "Machine Learning for Beam Based Mobility Optimization in NR"; Master of Science Thesis in Communication Systems Department of Electrical Engineering; Linkoping University; 2017; 85 pages.
3GPP TS 38.401, V16.1.0; 3rd Generation Partnership Project; Technical Specification Group Radio Access Network; NG-RAN; Architecture description (Release 16); Sophia Antipolis, Valbonne, France; Mar. 2020; 50 pages.
"Making 5G Proactive and Predictive for the Automotive Industry"; B2B Industry White Paper presented by 5GAA Automotive Association; 26 pages.
Simeone; "A Very Brief Introduction to Machine Learning With Applications to Communication Systems"; IEEE Transactions on Cognitive Communications and Networking; vol. 4, No. 4; Dec. 2018; 17 pages.
Mao et al.; "Deep Learning for Intelligent Wireless Networks: A Comprehensive Survey"; IEEE Communications Surveys & Tutorials; vol. 20, No. 4, Fourth Quarter 2018; 27 pages.
Challita et al.; "Deep Learning for Proactive Resource Allocation in LTE-U Networks"; European Wireless 2017; 23rd European Wireless Conference; May 17-19, 2017; 6 pages.
Zhou et al.; "Deep Learning-Based Beam Management and Interference Coordination in Dense mmWave Networks"; IEEE Transactions on Vehicular Technology; vol. 68, No. 1; Jan. 2019; 12 pages.
Yang et al.; "Generative-Adversarial-Network-Based Wireless Channel Modeling: Challenges and Opportunities"; EEE Communications Magazine; vol. 57, No. 3; Mar. 2019; 6 pages.
Challita et al.; "Proactive Resource Management for LTE in Unlicensed Spectrum: A Deep Learning Perspective"; IEEE Transactions on Wireless Communications; vol. 17, No. 7; Jul. 2018; 16 pages.
3GPP TR 23.791, V16.2.0; 3rd Generation Partnership Project; Technical Specification Group Services and System Aspects; Study of Enablers for Network Automation for 5G (Release 16); Sophia Antipolis, Valbonne, France; Jun. 2019; 124 pages.
"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.4.0, Dec. 2019, 3640 pages.
Al-Shamisi et al., "Verifying Measurements of Reference Signal Received Power (RSRP) on LTE Network using an App on Android Smartphones", IEEE 9th Annual Information Technology, Electronics and Mobile Communication Conference (IEMCON), Nov. 1-3, 2018, pp. 372-377.
"Transforming Radio Access Networks Towards Open, Intelligent, Virtualized and Fully Interoperable RAN", O-RAN, Retrieved on Nov. 29, 2024, Webpage available at : https://www.o-ran.org/.
"Unified architecture for machine learning in 5G and future networks", Focus group on Machine Learning for Future Networks including 5G (FG-ML5G), ITU-T FG-ML5G-ARC5G, Jan. 2019, 32 pages.
"5G Automotive Association; Working Group System Architecture and Solution Development; 5GS Enhancements for Providing Predictive QoS in C-V2X", 5GAA TR-200055, Technical Report, 2018, pp. 1-60.
"5G solutions for the connected mobility of the future", 5G NetMobil, Retrieved on Nov. 29, 2024, Webpage available at : https://5g-netmobil.de/.
Zhang et al., "Deep Learning in Mobile and Wireless Networking: A Survey", IEEE Communications Surveys & Tutorials, vol. 21, No. 03, Thirdquarter, 2019, pp. 2224-2287.
"Best Readings in Machine Learning in Communications", Comsoc, Retrieved on Nov. 29, 2024, Webpage available at : https://www.comsoc.org/publications/best-readings/machine-learning-communications.
"Email discussion on the scope of R17 SI enhancement of data collection for NR", 3GPP TSG RAN Plenary Meeting #87, RP-20XXXX, Cmcc, Mar. 16-20, 2020, 3 pages.
"3rd Generation Partnership Project; Technical Specification Group Radio Access Network; NG-RAN; F1 general aspects and principles (Release 16)", 3GPP TS 38.470, V16.0.0, Dec. 2019, pp. 1-13.
"3rd Generation Partnership Project; Technical Specification Group Radio Access Network; NG-RAN; F1 layer 1 (Release 15)", 3GPP TS 38.471, V15.0.0, Dec. 2017, pp. 1-6.
"3rd Generation Partnership Project; Technical Specification Group Radio Access Network; NG-RAN; F1 signalling transport (Release 15)", 3GPP TS 38.472, V15.6.0, Dec. 2019, pp. 1-9.
"3rd Generation Partnership Project; Technical Specification Group Radio Access Network; NG-RAN; F1 application protocol (F1AP) (Release 16)", 3GPP TS 38.473, V16.0.0, Dec. 2019, pp. 1-239.
"3rd Generation Partnership Project; Technical Specification Group Radio Access Network; NR; Physical layer measurements (Release 16)", 3GPP TS 38.215, V16.0.1, Jan. 2020, pp. 1-21.
Notice of Allowance received for corresponding European Patent Application No. 20720782.0, dated Jul. 4, 2024, 9 pages.

* cited by examiner

CHANNEL STATE INFORMATION VALUES-BASED ESTIMATION OF REFERENCE SIGNAL RECEIVED POWER VALUES FOR WIRELESS NETWORKS

CROSS-REFERENCE TO RELATED APPLICATIONS

This application is a national stage entry of International Application No. PCT/EP2020/060801, filed Apr. 17, 2020, entitled "CHANNEL STATE INFORMATION VALUES-BASED ESTIMATION OF REFERENCE SIGNAL RECEIVED POWER VALUES FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving a plurality of channel state information (CSI) values reported by the user device; determining a plurality of estimated reference signal received power (RSRP) values that have been estimated based at least on the plurality of CSI values; and outputting a sequence of RSRP values, including at least the estimated RSRP values.

According to another example embodiment, an apparatus comprising means for receiving a plurality of channel state information (CSI) values reported by the user device; means for determining a plurality of estimated reference signal received power (RSRP) values that have been estimated based at least on the plurality of CSI values; and means for outputting a sequence of RSRP values, including at least the estimated RSRP values.

In another example embodiment, a computer program comprising instructions which, when the program is executed by a computer, cause the computer to carry out the method receiving a plurality of channel state information (CSI) values reported by the user device; determining a plurality of estimated reference signal received power (RSRP) values that have been estimated based at least on the plurality of CSI values; and outputting a sequence of RSRP values, including at least the estimated RSRP values.

According to another example embodiment, an apparatus comprises at least one processor; and at least one memory including computer program code; the at least one memory and the computer program code configured to, with the at least one processor, cause the apparatus at least to: receive a plurality of channel state information (C SI) values reported by the user device; determine a plurality of estimated reference signal received power (RSRP) values that have been estimated based at least on the plurality of CSI values; and output a sequence of RSRP values, including at least the estimated RSRP values.

Other example embodiments are provided or described for various described example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1:
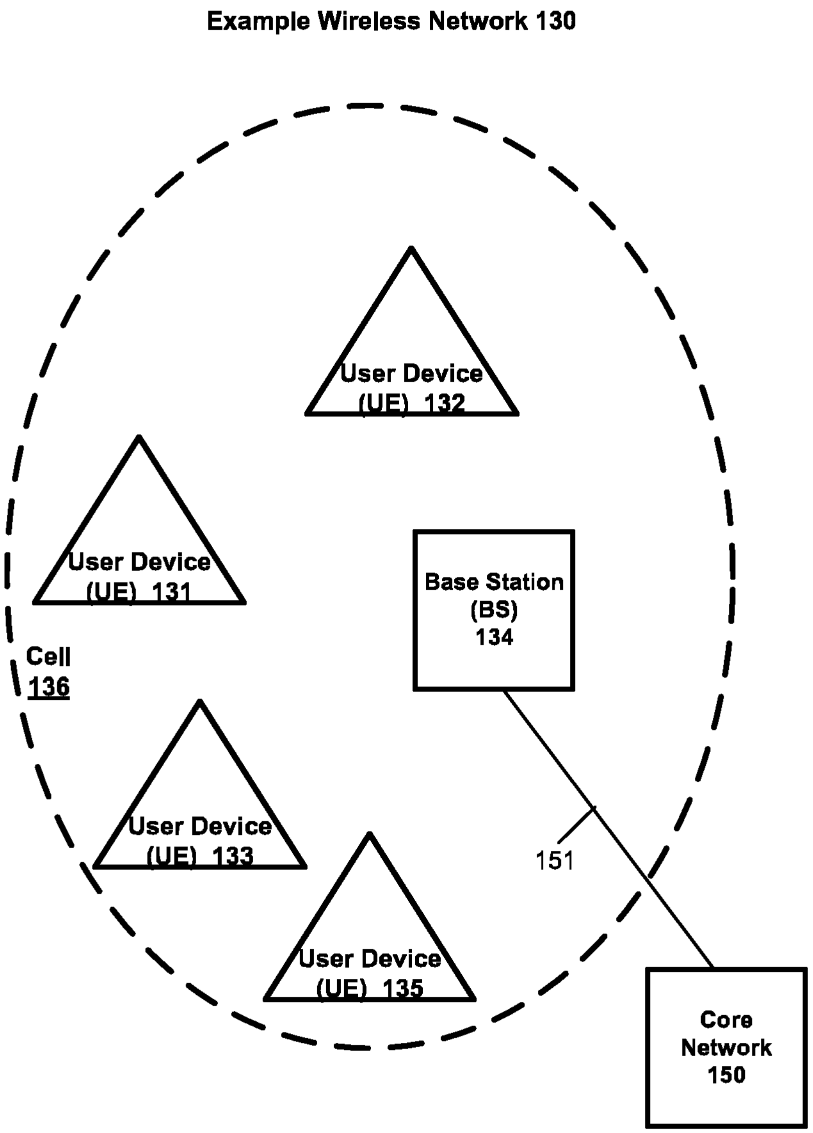
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, NR sidelink communications, etc., or any other wireless network or wireless technology. These example networks, technologies or data service types are provided only as illustrative examples.

A UE may be configured to measure one or more signal parameters or quantities, and then send a measurement report(s) to the network node (e.g., gNB or BS). In an example embodiment, a network node (e.g., gNB or BS) may send a report configuration to a UE, e.g., to cause the UE to carry out signal or radio measurements and reporting of these measurements to the gNB. The report configuration may indicate, e.g., downlink resources on which measurements should be carried out, a quantity or set of quantities to be reported, and/or how often the reporting should be performed (e.g., on demand by the gNB, or periodic reporting, or other reporting condition). In an example embodiment, a UE may be configured to measure a reference signal received power (RSRP) or a channel state information (CSI) based on channel state information-reference signal (CSI-RS) beams and/or synchronization signal blocks (SSBs) beams.

RSRP reports (reports of measured RSRP values from a UE) may, for example, be used (or useful) for a number of different applications or procedures of a network node or by the core network. For example, RSRP values may be used by a radio resource measurement (RRM) function or procedures, or other application, e.g., implemented at the network node, for example. Some of these applications (e.g., RRM procedures and other applications) may be used to adjust or assist with network operation, and/or or improve various aspects of network operation, based on varying or changing channel conditions (e.g., as reflected by the RSRP values reported to the gNB). For example, RRM procedures may include determining a location of a UE, or performing a cell change or UE handover for UE multi-connectivity. A number of RRM procedures may use or may rely upon RSRP reports. For example, an A3 condition, causing the UE to send a RSRP report to the serving gNB, may be triggered when a RSRP value of a neighbor cell/neighbor gNB is, for example, at least a threshold better than a RSRP of the serving cell/serving gNB. Thus, for example, RSRP values may be used to assist in (and useful for) performing cell change or handover decisions for a UE, as some examples. There are a number of other RRM procedures that may use RSRP values (RSRP reports) from UEs to improve or adjust network operation for various nodes or cells.

Furthermore, in an example embodiment, artificial intelligence (AI)/machine learning (ML) techniques (e.g., which may be referred to as AI/ML-neural networks or ML model(s)) may be used to assist or improve various aspects of network operation or network performance, such as radio network management, fault detection, failure monitoring, intrusion detection, channel encoding/decoding, channel estimation/prediction, resource allocation/scheduling, mobility optimization (e.g., improving UE cell change or UE handover), etc. For best performance, such models and/or other network-related applications (e.g., RRM applications or procedures) may be based on a significant amount and/or a steady flow of data (such as RSRP values reported by UEs).

The current reporting of RSRP values, for some situations, may not be adequate for at least some network-related applications, procedures or ML models. There may be a number of drawbacks or disadvantages with respect to the RSRP values and/or the manner in which measured RSRP values are currently reported by UEs to gNBs/BSs, such as, for example: 1) RSRP reports are based on measurement values that are averaged over time, and often times reported by the UE irregularly and/or infrequently. RSRP values are typically averaged over an extended period of time, e.g., which may be hundreds of milliseconds, for example. Also, in some cases, a RSRP report from a UE may be triggered (e.g., caused to be transmitted by the UE) only for specific conditions, such as an A3 handover or cell change condition in which a neighbor cell RSRP is better (stronger) by more than a threshold of the RSRP of the serving cell, as an example. Also, the filtering of RSRP values, or transmission of RSRP reports to a gNB/BS only for certain conditions or events, significantly reduces signaling overhead for RSRP reports. However, by decreasing the RSRP report overhead, this also significantly decreases the amount of RSRP values that are available for various network-related applications, procedures and/or ML models. 2) There may be RSRP value inaccuracies or inconsistencies. For example, the actual accuracy of the radio measurements (measurement of RSRP values, for example) may depend on implementation specific physical layer solutions used in each UE (e.g., channel estimation, beam tracking). Information on implementation of the RSRP estimation algorithm and its accuracy may typically be UE chipset vendor specific, for example. These factors may contribute, at least in some situations, to a decrease in reliability and/or accuracy of RSRP values.

Thus, for example, an irregular reporting of RSRP values based on averaging, RSRP value inconsistencies among different UE equipment vendors, and/or other factors, may, at least in some cases, result in an inadequate quality (e.g., reliability and/or accuracy) and/or quantity/frequency of reported RSRP values. Such issues or limitations on RSRP reports may, at least in some cases, limit or inhibit operation of one or more network-related applications, procedures (e.g., RRM procedures) or ML models that may rely on RSRP data to assist with network operation or to improve or adjust parameters or features of one or more nodes within a network. UEs could be configured to more frequently report RSRP values. However, significantly increasing the frequency of RSRP reports may result in increased signaling overhead, and therefore, may not be a preferred option to increase the quality and/or quantity of RSRP reports, at least in some cases.

As noted, a UE may be configured to measure a parameter(s) of a reference signal, such as to determine a channel state information (C SI) based on channel state information-reference signal (CSI-RS) beams and/or synchronization signal blocks (SSBs) beams. CSI reports may be periodic or triggered (by the gNB), and can be wideband (e.g., based on all PRBs (physical resource blocks) of a frequency band) or sub-band (based on a subset of PRBs or specific PRBs) An example CSI report may include, for example, one or more of: a Rank Indicator (RI), providing a recommendation on a transmission rank to use, or a number of layers that should be used for downlink communication with the user device/UE; a Precoder Matrix Indicator (PMI), which may indicate a preferred or suggested precoder to use for downlink communication with the user device, e.g., based on the suggested RI; and a Channel Quality Indicator (CQI) that indicates a highest modulation and coding scheme (MCS) that is suggested for downlink communication with the user device/UE, e.g., based on the selected PMI and RI. In general, precoding may include a node (e.g., BS or gNB) applying a set of precoding weights (each weight including amplitude and/or phase) to a signal or to an antenna (e.g., in order to change the amplitude and/or phase of a transmitted signal), for example, based on the qualities of a channel between the UE and the BS or network node. In an example embodiment, a CSI report (or CSI measurement report) sent by a UE may include one or more of a RI, PMI and/or CQI.

The CSI report may be transmitted by a UE to a gNB/BS via a physical uplink control channel (PUCCH) resources allocated to the UE. Alternatively, if a UE has an uplink (UL) grant (e.g., dynamic grant or configured grant) via a physical uplink shared channel (PUSCH), then the UE may (e.g., in addition to transmitting data) may transmit (e.g., or may multiplex) the CSI report via some of the resources of the PUSCH channel. Thus, for example, transmitting a CSI report to a gNB/BS may be performed fairly frequently or regularly (e.g., via PUCCH resources that are allocated to each UE, or via PUSCH whenever the UE has an UL grant), using resources that have already been granted or allocated to the UE, which may not typically result in a significant increase in signaling overhead (as the PUCCH and/or PUSCH resources have already been allocated to the UE). RSRP reports may be transmitted via radio resource control (RRC) message/signaling, e.g., from a RRC entity of a UE to a corresponding RRC entity provided at a gNB (or to a RRC entity provided at a centralized unit (CU/gNB-CU) where the gNB is provided with a split architecture including a gNB-CU and at least one gNB-DU). As noted above, RSRP reports are not typically reported on a frequent or regular basis, and doing so may have the drawback of significantly increasing signaling overhead (and may require additional resources) for the UE and/or gNB/BS.

However, it has been determined that a significant correlation exists between CQI values and RSRP values. As noted, a CQI value may be a Channel Quality Indicator (CQI) that indicates a highest (or suggested) modulation and coding scheme (MCS) that is suggested for downlink communication with the user device/UE. The CQI may be determined by the UE based on received DL signals received by the UE from the gNB/BS, such as based on channel state information-reference signal (CSI-RS) beams and/or synchronization signal blocks (SSBs) beams, for example.

For example, live radio measurements were performed within a 3GPP network for RSRP values and CQI values (for multiple cells), and the Pearson correlation coefficient was calculated for CQI and RSRP values. The Pearson correlation coefficient may provide a measure of the linear correlation between two variables X and Y, and may, for example, be defined as:

$$r = \frac{n(\sum xy) - (\sum x)(\sum y)}{\sqrt{\left[n\sum x^2 - (\sum x)^2\right]\left[n\sum y^2 - (\sum y)^2\right]}}$$

Where r is the Pearson correlation coefficient,
n is a numberof pairs of variables,
Σxy is the sure of the product of va bles,
Σx is the sum of values of x variable,
Σy is the sum of values of y variable,
$\Sigma x^2$ is sum of squares of values of the variable
$\Sigma t^2$ is the sum of squares of the y variable The Pearson correlation coefficient is a test statistic that measures the statistical relationship, or association (or correlation), between two variables. It provides information about the magnitude of the association, or correlation, as well as the direction of the relationship. Pearson correlation coefficient has a value between +1 and −1, where +1 is total positive linear correlation, 0 is no linear correlation, and −1 is total negative linear correlation.

Based on radio (e.g., RSRP and CQI) measurements for a group of cells (e.g., 18 cells in this specific experiment), the Pearson's correlation coefficient metric was calculated indicating the relationship (correlation) between CQI and RSRP measurements based on a real data set collected from the network. The Pearson's correlation coefficient is first performed over the whole set including 18 cells and shows that the CQI is highly correlated to the RSRP (with an average Pearson's correlation coefficient of +0.53 among the 18 cells, in this field experiment). Thus, from a statistical point of view, there is a strong correlation between CQI and RSRP.

Focusing on a single cell measurement, for example, at least for some cells, this correlation was even higher, (the Pearson correlation coefficient is 0.68 for one of the cells). This high correlation, and even the average Pearson correlation coefficient of +0.53, indicates that supervised learning (or ML model, AI neural network (NN), etc.) may be used in order to predict RSRP values as function of CQI values, for example. To this end, an example of a feedforward neural network was tested. However, other NN based architectures or ML models may be used as well such as recurrent NN where time series inputs are considered. For each cell, dataset is split into 70% to perform the training of the NN model and 30% to test the performance. The prediction error is estimated with root mean square error measure:

$$RMSE = \sqrt{\frac{\sum_{i=1}^{N}(Predicted_i - Actual_i)^2}{N}}$$

TABLE 1

Performance evaluation results for 4 example cells

| PCI (physical cell ID) | 1 | 2 | 3 | 4 |
|---|---|---|---|---|
| Pearson Correlation coefficient | 0.68 | 0.57 | 0.41 | 0.72 |
| RMSE (root mean square error) [dB]: RSRP prediction as function of CQI | 4.84 | 6.59 | 5.41 | 5.94 |

Table 1 shows results for 4 cells, where the Pearson correlation coefficient varies from 0.68, 0.57. 41 and 0.72, which indicates a strong positive correlation between CQI values and RSRP values. Other values or measurements of a CSI report (e.g., the rank indicator (RI) values and/or a precoder matrix indicator (PMI) values, in addition to the CQI) may also have a positive correlation with RSRP values.

Therefore, according to an example embodiment, a network node (e.g., BS or gNB) may determine a plurality of estimated reference signal received power (RSRP) values based at least on a plurality of channel state information (CSI) values reported by a UE/user device (e.g., where each of the CSI values may include a CQI, RI and/or a PMI). For example, each of the reported CSI values may include at least a CQI value reported by the UE (RI and PMI may also be included in the CSI report). In an example embodiment, the network node may determine a plurality of estimated RSRP values based at least on a plurality of CQI values reported by a UE/user device, e.g., which is made possible, or may be based upon, the strong positive correlation between CQI values and RSRP values, as explained above. Also, in an example embodiment, a network node (e.g., BS or gNB), or other node or device, may determine a plurality of estimated RSRP values based at least on a plurality of channel state information (CSI) values reported by a UE and a plurality of measured RSRP values that were measured and reported by the UE.

Thus, for example, a method or technique may include determining a plurality of estimated RSRP values that have been estimated based at least on the plurality of CSI values reported by a UE and a plurality of measured RSRP values reported by the UE. For example, a set of rules, and/or a model (e.g., a model, which may be referred to as a machine learning (ML) model, or an AI/ML neural network) may be trained based on training data, and then used to determine a plurality of estimated RSRP values. Thus, for example, the model may be trained based on a plurality of CSI values (e.g., including CQI values) that were reported by a UE, and a plurality of corresponding measured RSRP values reported by the UE. For example, the reported CSI values may be corresponding to the RSRP values reported by the UE, e.g., where corresponding may mean that these (at least some of these) corresponding CSI values and RSRP values may be within a same limited period of time (since channel conditions for a UE may change over time) and/or may be for or from the same UE. For example, the strong positive correlation between reported RSRP values and reported CQI values may be due to these values being measured or determined for a same UE-BS channel conditions, within a limited period of time, e.g., since such channel may change over time. Also, a set of corresponding RSRP values and reported CQI values may be provided, and used for training the model, for a plurality of UEs, at least in some cases.

Once a ML model (e.g., which may also be referred to as an AI/ML neural network) has been trained, e.g., based on reported CSI (e.g., including CQI) values and/or reported RSRP values, then subsequent data and/or live data (e.g., reported CSI (e.g., including CQI) values and reported RSRP values) may be used as inputs, to determine a plurality of estimated RSRP values, based on the ML model.

Figure 2:
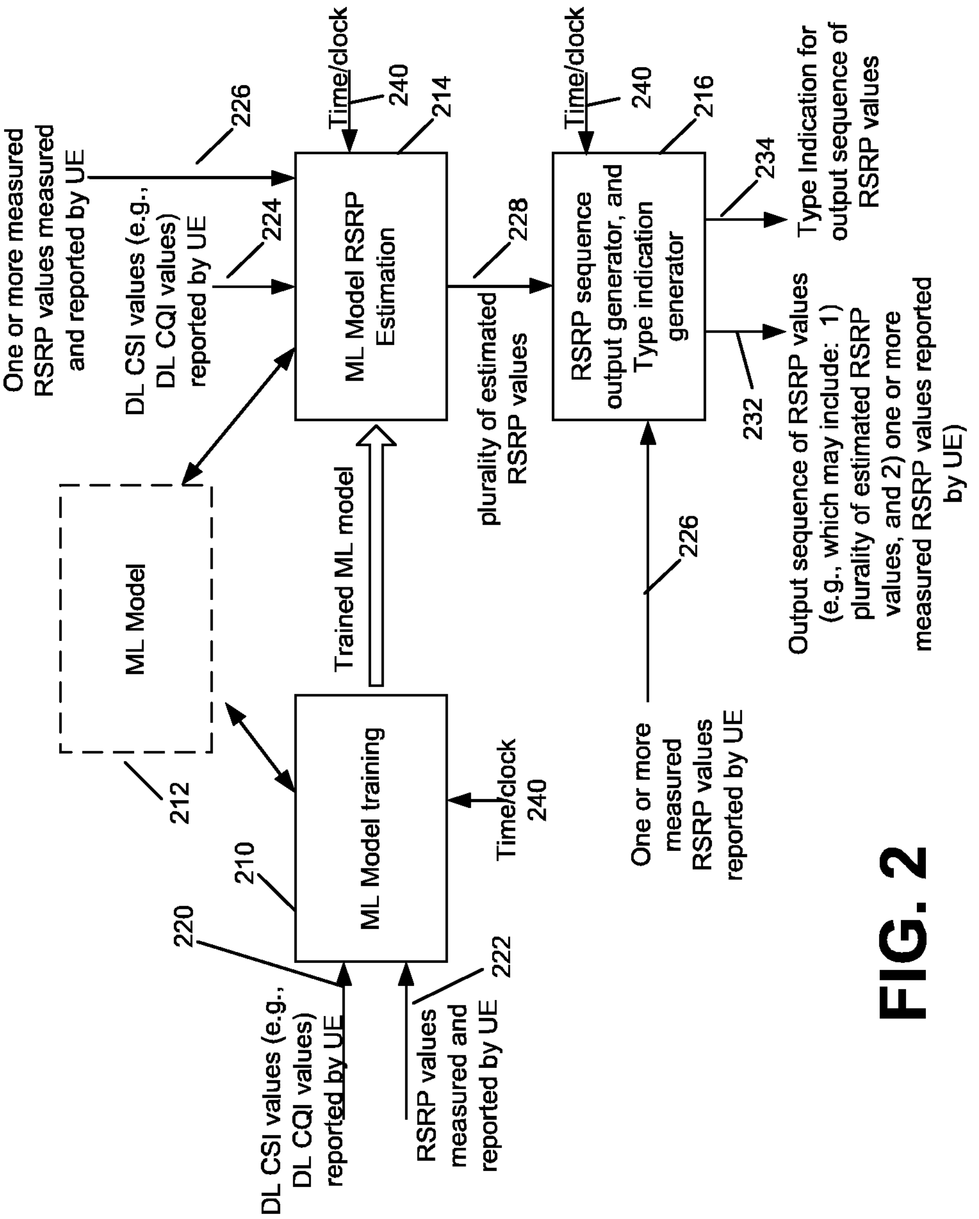
FIG. 2 is a block diagram illustrating a neural network (or machine learning) based system for estimating reference signal received power (RSRP) values according to an example embodiment.

FIG. 2 is a block diagram illustrating a neural network (or machine learning) based system for estimating reference signal received power (RSRP) values according to an example embodiment. As shown in the example embodiment of FIG. 2, a machine learning model 212 (or AI/ML neural network) may be trained by ML model training block 210, e.g., based on training data received via lines 220 and 222, including downlink (DL) channel state information (CSI) values reported by a UE via line 220, and RSRP values measured and reported by the UE via line 222. Based on this training data, the ML model training block 210 may train the ML model 212, e.g., to determine (or estimate) estimated RSRP values based on reported RSRP values and reported CSI (e.g., CQI) values. For example, there may be certain reported RSRP values that typically occur or coincide with certain reported CQI values, and the training of the ML model 212 may involve the ML model learning how to determine or estimate RSRP values based on reported CSI values (e.g., reported CQI values) and possibly some (e.g., less frequent) reported RSRP values. The training data (which may be input to the ML model training block 210 to train ML model 212), may include some reported CQI/CSI values that may correspond to some reported RSRP values, e.g., wherein for at least some of the training data, the reported CSI values and reported RSRP values used for training may be reported from a same UE and/or may be provided (or measured) for a same or similar time period, for example. Also, for example, training may be repeated or performed from time to time, periodically, or when new data is available, e.g., to update ML model 212. A time or clock (time/clock) input 240 may be input to ML model training block 210, e.g., so that the ML model training block 210 can, e.g., identify reported CSI/CQI values that correspond to (e.g., at around the same time, or within a same limited time period as) one or more measured RSRP values. Thus, the time/clock input 240 may allow the ML model training to train the ML model 212, e.g., based on CSI/CQI reports that correspond (e.g., correspond in time, or are provided or reported within the same limited period of time) to one or more measured RSRP values reported by the UE.

The source of RSRP measurements input can be either RSRP reports from the UEs, or alternatively may be Immediate MDT reports. Also, for example, the ML model training block 210 can use other inputs as well, depending on the example implementation, such as, for example: pre-labelled reference RSRP values (e.g., determined with high accuracy), time stamps for the input RSRP and/or CSI/CQI values, and/or other UE context information, such as velocity, mobility state, etc.

The trained ML model (212) may be provided to a ML model RSRP estimation block 214. The ML model RSRP estimation block 214 may be provided at (or as part of) a same or a different entity or node as the ML model training block 210. ML model RSRP estimation block 214 may receive as inputs some subsequent data or live data, for example, which may include one or more measured RSRP values measured and reported by the UE and input to ML model RSRP estimation block 214 via line 226, and CSI values (e.g., CQI values) reported by the UE and input to ML model RSRP estimation block via line 224. After the ML model 212 has been trained (e.g., by ML model training block 210), ML model RSRP estimation block 214 may determine a plurality of estimated RSRP values that are estimated based at least on the plurality of channel state information (C SI) (or CQI) values reported by the UE/user device (e.g., received as an input via line 224), based on the trained ML model 212. Alternatively, the ML model estimation block 214 may determine a plurality of estimated RSRP values that are estimated based at least on the plurality of CSI values reported by the UE/user device (e.g., received as an input via line 224) and the one or more measured RSRP values reported by the UE (e.g., received as an input via line 226), based on the trained ML model 212. The time/clock input 240 to ML model RSRP estimation block 214 may allow, for example, estimated RSRP values to be output via line 228 (e.g., at specific time instances, or having a specific sequence of estimated values).

The plurality of estimated RSRP values, determined by ML model RSRP estimation block 214, may be output via line 228 to a RSRP sequence output generator and Type indication generator 216 (which may simply be referred to as generator 216). Also, generator 216 may receive, as further inputs, one or more measured RSRP values reported by the UE, and then input to generator 216 via line 226. Thus, generator 216 may receive, as inputs, two types of RSRP values, including: measured and reported RSRP values (via line 226), and estimated RSRP values (e.g., which were estimated based at least on CSI or CQI values, based on the trained ML model) via line 228. A time/clock input 240 to generator 216 may indicate a time or timing of one or more of the measured RSRP values reported by the UE (input via line 226) and/or a time or timing of one or more of the estimated RSRP values received via line 228, e.g., so that the generator 216 may know or determine a time, and/or time order, of the measured RSRP values and the measured RSRP values. The time/clock 240 may also be used to estimate a model error afterwards (to be able to determine the correspondence (e.g., in time, such as same time, or within a time window or time threshold) between measured RSRP values and estimated RSRP values, and thus, allow the system to determine an error or difference between these measured and reported RSRP values, for example).

The generator 216 may output a sequence (e.g., a time-series sequence, or a regularly spaced time sequence) of RSRP values via line 232, which may include, e.g., a combination of both the plurality of estimated RSRP values and at least one (or even a plurality) of the measured RSRP values reported by the UE. Thus, for example, while the actual measured and reported RSRP values may be infrequent and/or irregular in time, the determining of estimated RSRP values (e.g., based at least on CSI or CQI values) may allow the generator 216 to output a sequence of RSRP values that may be, e.g., evenly or regularly spaced (e.g., a RSRP value every time period), or substantially even spaced sequence of RSRP values (e.g., a RSRP value every x ms within a threshold of y ms, such as output a RSRP value every 5 ms, plus or minus 1 ms), or at least which may provide more frequent RSRP values, as compared to the measured and reported RSRP values. Thus, for example, generator 216 may output, via line 232, a sequence of RSRP values that include measured RSRP values, and also one or more estimated RSRP values in the time gaps between successive measured RSRP values.

In addition, generator 216 may also output (e.g., via line 234) a Type indication that indicates, for one or more of the output RSRP values (e.g., RSRP values output via line 232), whether the output RSRP value is a measured RSRP value that was reported by the UE, or an estimated RSRP value.

Figure 3A:
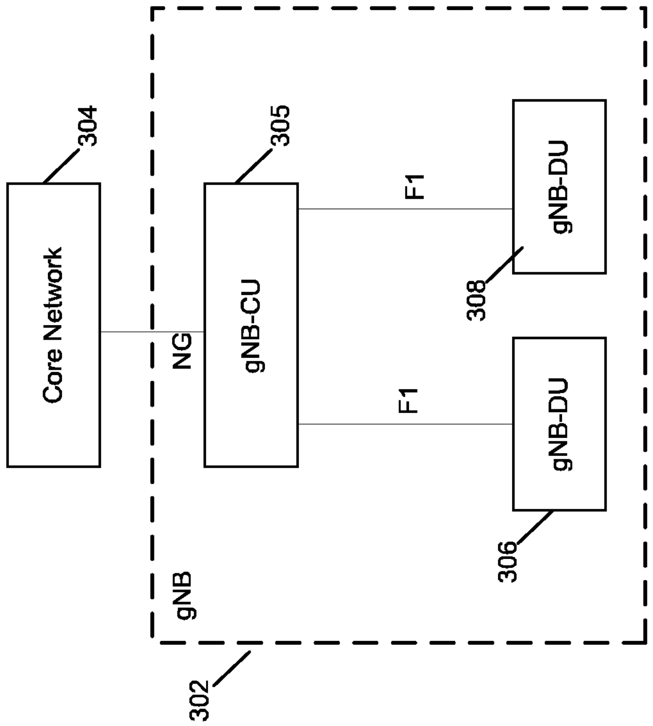
FIG. 3A is a block diagram of a gNB having a split architecture according to an example.

FIG. 3A is a block diagram of a gNB having a split architecture according to an example. A gNB (network node) 302 may be connected to core network 304 via NG interface. gNB 302 may include a centralized unit (gNB-CU) 305, and one or more distributed units (gNB-DUs) 306, 308. gNB-DUs 306 and 308 are each connected to (or in communication with) gNB-CU 305 via Fl interfaces, for example.

Figure 3B:
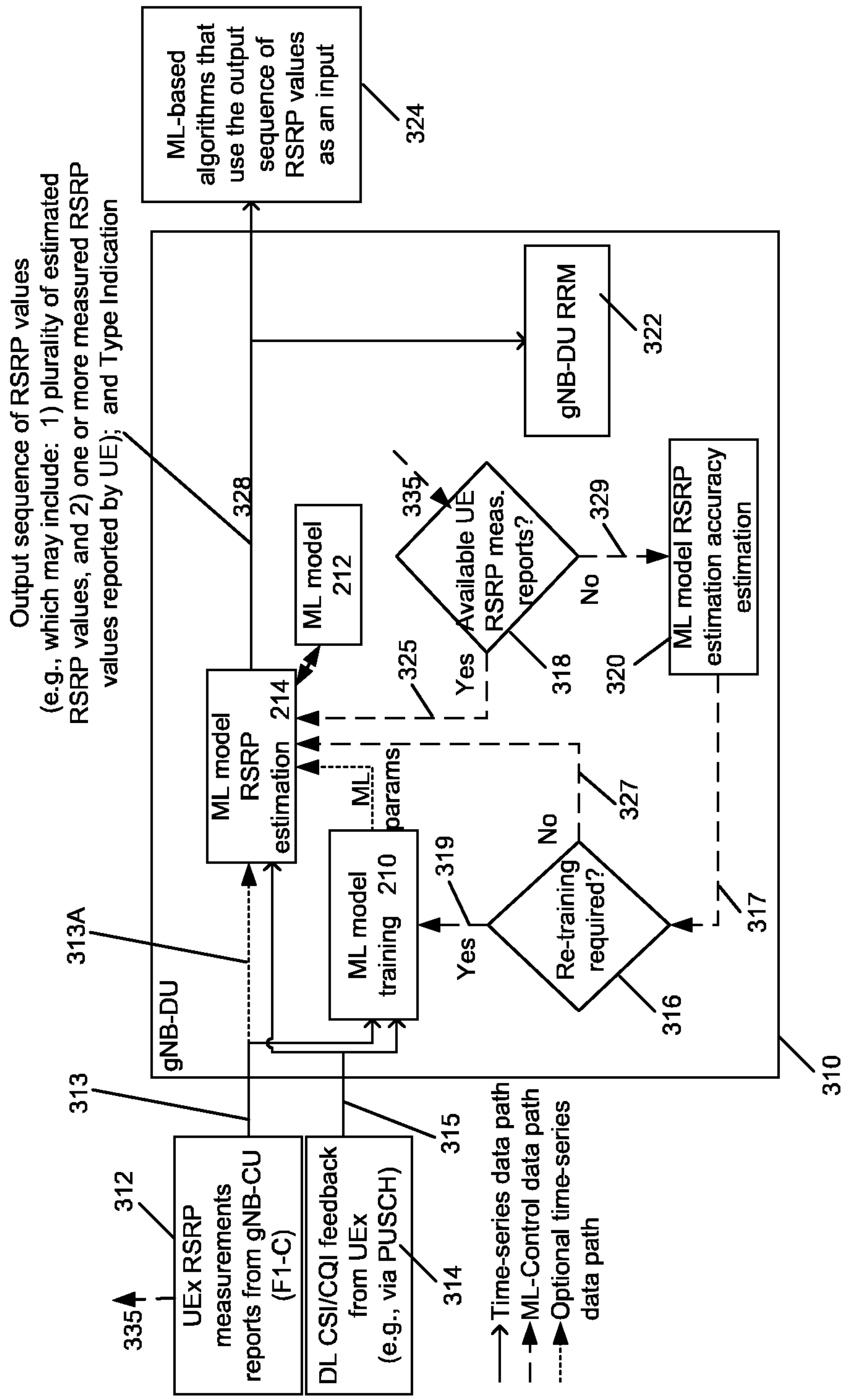
FIG. 3B is a block diagram of a system to perform model training and then to determine reference signal received power (RSRP) estimated values based on a trained model according to an example embodiment.

FIG. 3B is a block diagram of a system to perform model training and then to determine reference signal received power (RSRP) estimated values based on a trained model according to an example embodiment. As noted above, a gNB may, for example, be provided as a split architecture with one centralized unit (CU), and one or multiple distributed units (DUs). In an example embodiment, the radio resource control (RRC) entity of the gNB may be located at the CU. One function of the RRC entity is to receive and process RSRP values reported by a UE (RRC protocol entity of CU receives RSRP values from a RRC counterpart protocol entity at the UE). The CSI (e.g., CQI, RI, PMI) values may be received by a DU, and stored in the DU. According to an example embodiment, a gNB distributed unit (DU) 310 is shown in FIG. 3B. In this illustrative example, both the ML model training block 210 and the ML model RSRP estimation block 214 are provided within or as part of the DU 310. The ML model 212 (FIG. 2) may also be stored on or within the DU 310, or may be stored at other location, or on other device or system outside the RAN. Thus, in this illustrative example shown in FIG. 3B, the gNB-DU 310 includes (or may include) the ML model training block 210, the ML model RSRP estimation block 214, and the ML model 212.

As shown in FIG. 3B, UEx RSRP measurement reports 312, indicating or including RSRP values measured by a UEx and reported to the gNB-CU, are input via line 313 through the Fl interface to ML model training block 210, and also possibly (in an example embodiment) input via line 313A to ML model RSRP estimation block 214. Also, DL CSI values 314 (e.g., which may include CQI values), which are measured and reported by the UEx to DU 310, are input via line 315 to both ML model training 210 and ML model RSRP estimation block 214. Similar to FIG. 2, ML model 212 is connected to, or in communication with, both ML model training block 210 and ML model RSRP estimation block 214 (although the connection between ML model training block 210 and ML model 212 is not shown in FIG. 3B).

ML model training 210 may perform training of the ML model 212, e.g., based on measured RSRP values 312 reported by UEx to the CU, which are forwarded to the DU, and based on CSI values 314 (e.g., including CQI values) measured and reported by the UEx to the DU 310. The ML model 212 and any ML parameters may be provided by ML model training block 210 to the ML model RSRP estimation block 214. Block 318 may receive a control signal input 335 from gNB-CU indicating if there is a RSRP report available. Block 318 may notify (via control signal indicated on line 325) the ML model RSRP estimation block 214 if there are any available UE RSRP measurement reports. If there are RSRP reports available, these RSRP reports (measured RSRP values) may be received by ML model RSRP estimation block 214 via line 313A, or via other input (not shown). Block 318 may also indicate via line 329 to block 320 that there are no available UE RSRP measurement reports. Also, block 316 may confirm via line 327 to ML model RSRP estimation block 214 that retraining of the ML model 212 is not necessary right now. If there are UE RSRP measurement reports available, and, e.g., if retraining of the ML model 212 is not required (e.g., ML model RSRP estimation block 214 is currently operating with sufficient accuracy or performance level), then the ML model RSRP estimation block 214 may determine a plurality of estimated RSRP values, based on the received inputs 312, 314. In the event there are no available UE RSRP measurement reports, block 320 may perform a ML model RSRP estimation accuracy estimation, e.g., by comparing one or more estimated RSRP values to actual (measured) RSRP values, and determining an error, or an average error, or other performance measurement. When such error exceeds a threshold (or when performance of block 214 degrades to below a threshold level), this may trigger an output via line 317 from block 320 to cause block 316 to trigger or cause, via line 319 a retraining of ML model 212 to be performed. Thus, the 318-320-316 chain indicates that when no input RSRP values are available, the block 320 monitors the output accuracy and triggers re-training of ML model 212 if needed.

In an example embodiment, the ML model RSRP estimation block 214 may output, via line 328, a sequence of RSRP values that may include the plurality of estimated RSRP values. Alternatively, the ML model RSRP estimation block 214 may output a sequence of RSRP values that includes both the plurality of estimated RSRP values and one or more of the measured RSRP values that were reported by the UEx. The output of the ML model RSRP estimation block 214 may also include the Type indication that indicates, for one or more output RSRP values, whether the output RSRP values is a measured RSRP value or an estimated RSRP value. For example, the measured RSRP values may be considered more accurate than the estimated RSRP values, and/or any application or ML models using or relying on RSRP values as inputs may place a higher confidence level on the measured RSRP values, and a lower confidence level on the estimated RSRP values. The output of RSRP values from ML model RSRP estimation block 214 may be input to a gNB-DU RRM (radio resource measurement) application or procedure 322, and to one or more applications or algorithms, e.g., ML-based algorithms 324 that may use or rely on the sequence of output RSRP values as input.

Figure 4:
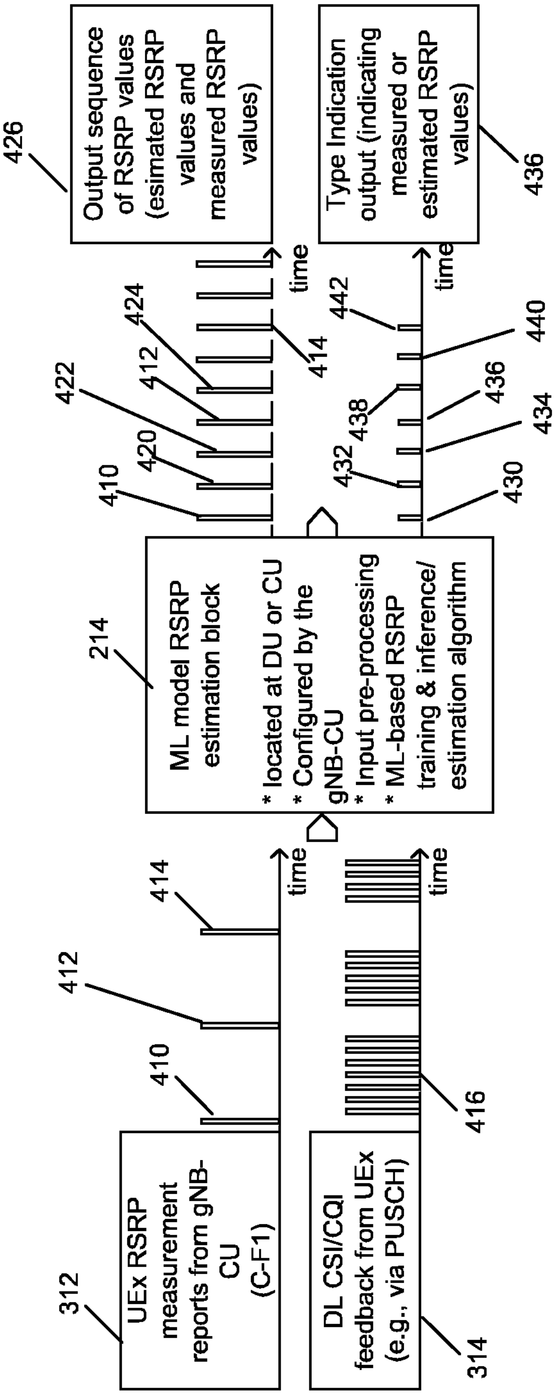
FIG. 4 is a diagram illustrating example inputs and outputs for reference signal received power (RSRP) value estimation according to an example embodiment.

FIG. 4 is a diagram illustrating example inputs and outputs for reference signal received power (RSRP) value estimation according to an example embodiment. As shown in FIG. 4, a ML model RSRP estimation block 214 may receive as inputs, signals 312 and 314. As shown, UEx RSRP measurement reports 312, indicating or including RSRP values measured by a UEx and reported to the gNB-CU, and DL CSI values 314 (e.g., which may include CQI values), which are measured and reported by the UEx, are input to ML model RSRP estimation block 214. For example, the measured RSRP values 312, reported by the UEx, may include UEx measured RSRP values 410, 412 and 414, for example. Also as shown, the reported CSI/CQI values 314 reported by the UEx may include a group or set of CSI (e.g., CQI) values 416.

In an example embodiment, ML model RSRP estimation block 214 may determine a plurality of estimated RSRP values, based on the received inputs 312, 314. The ML model RSRP estimation block 214 may output a sequence of RSRP values that may include a plurality of estimated RSRP values. In an example embodiment, the ML model RSRP estimation block 214 may output a sequence of RSRP values 426 that may include both one or more of the measured RSRP values (e.g., 410, 412, 414, . . . ) and a plurality of estimated RSRP values (e.g., 420, 422, 424, . . . ). Thus, for example, ML model RSRP estimation block may output a sequence of RSRP values including, for example (in the following time-series or time sequence), the RSRP values of 410, 420, 422, 412, 424, etc. As shown in the example output sequence 426 in FIG. 4, some measured RSRP values may be output as part of the output sequence of RSRP values 426. Also, in order to provide a sequence (e.g., a regularly spaced time sequence, within a threshold variation of time) or time-series of RSRP values, e.g., in which RSRP values may be output more frequently, and may be even be regularly spaced (e.g., an RSRP value output every x ms, within a time variation of y ms, such as an RSRP value output every 5 ms, plus or minus 1 ms), the output sequence of RSRP values may include measured RSRP values, and one or more estimated RSRP values that may be, for example, provided in the time gaps or intervals between successive output measured RSRP values, for example.

The output of the ML model RSRP estimation block 214 may also include a Type indication that indicates, for one or more output RSRP values, whether the output RSRP value is a measured RSRP value or an estimated RSRP value. For example, the Type indication may provide a signal as part of Type indication output 436, corresponding to each output RSRP value of output sequence 426, indicating whether the corresponding output RSRP value is a measured RSRP value or an estimated RSRP value.

As shown in FIG. 4, the output sequence of RSRP values 426 may include the RSRP values of 410, 420, 422, 412, 424, etc. The Type indication output 436 may include the following Type indication signals of 430, 432, 434, 436, 438, 440 and 442, which provide a Type indication for the RSRP output values of 410, 420, 422, 412, 424, respectively. For example, the output RSRP values of 410 and 412 may be indicated as measured RSRP values by their corresponding Type indications 430 and 436, respectively. Similarly, the RSRP output values 420 and 422 may be indicated by their corresponding Type indication signals 432 and 434, respectively, as being estimated RSRP values. This is just an illustrative example, and other types of Type indication signals or Type indications may be provided for this purpose. For example, another technique may be to only provide a Type indication signal for an output RSRP value if that RSRP value is measured. Other alternative signals may be used, e.g., a signal that indicates which output RSRP values are estimated, or a bit map that includes a bit for each RSRP value, wherein each bit may indicate whether the RSRP value is measured or estimated.

As noted above, in the example of FIG. 3B, a DU (gNB-DU) may include both the ML model training block 210 and the ML model RSRP estimation block 214. In this case, the RSRP measurements would be signaled or forwarded by the CU to the DU.

In another example embodiment, a gNB centralized unit (CU) may include the ML model training block 210 and the ML model RSRP estimation block 214. In this case, the CQI reports/CSI reports from the UE would be forwarded by the DU to the CU.

In another example embodiment, a gNB-DU may include the ML training block 210, and a gNB-DU may include the ML model RSRP estimation block 214.

Or, in another example embodiment, a gNB-CU may include the ML training block 210, and a gNB-DU may include the ML model RSRP estimation block 214. This configuration may reduce the need for high ML computation power/resources at the gNB-DU. The retraining may be performed at a much lower rate compared to normal RSRP estimation, and thus this configuration may reduce or mitigate a high signaling load due to forwarding of CSI/CQI reports.

In yet another embodiment, the ML model RSRP estimation block is provided at the gNB-DU, where the ML model RSRP estimation block is configured by the gNB-CU (E.g., sampling period, time interval, UE transmission/reception mode), so that the RSRP and CQI measurements may be optimally and flexibly utilized.

In yet another embodiment, the ML model RSRP estimation block is provided at the gNB-DU, where the ML model RSRP estimation block is configured to use RSRP measurement reports and CQI/CSI feedback from one or more UEs identified by the gNB-CU or the core network (CN).

Or, in another embodiment, the ML training block and the ML model RSRP estimation block may be provided at an external node or device, such as a device in the cloud, or the core network, or other device.

The network may collect measurements (e.g., CSI/CQI measurements and RSRP measurements) from a plurality (e.g., a group associated) UEs, and then the ML model may be trained based on these measurements. Then, a plurality of estimated RSRP values may be determined based on the trained ML model and data (e.g., CQI values).

For example, the network can instruct a set of UEs to collect RSRP measurements by activating a Trace Session for instance to report Immediate Minimization for Drive Tests (MDT) data. In case of Immediate MDT, measurements could comprise RSRP measurements that are reported, when measured, from the UE to the network. In the Trace Configuration, the network can indicate the area in which the MDT data collection will take place. In an illustrative example, UEs in the specified area will be reporting measurements to the network. This is indicated through an optional parameter in the Trace Configuration, the "Area Scope" parameter. The Area Scope may support the PLMNs (public land mobile networks) of the MDT PLMN list. If Area Scope is not specified in the Configuration, the MDT data collection will be done in the PLMNs of the MDT PLMN list of the Trace Configuration. If Area Scope is specified, the network can narrow down the area in which measurements will be performed instead of per PLMN to a more refined region. For example, in UMTS the Area Scope parameter can be given through a list of cells, identified by Cell Global Identifier (CGI) with a maximum CGI of 32 being defined, a list of Routing Area (RA), identified by Routing Area Identification (RAI) with a maximum RAI of 8 being defined or a list of Location Area (LA), identified by Location Area Identification (LAI) with a maximum LAI of 8 being defined. In LTE and NR, the Area Scope can be given through a list of cells, identified by the E-UTRAN-CGI or NG-RAN CGI, with a maximum CGI value of 32 being defined, a list of tracking Area (TA) identified by a Tracking Area Code (TAC) with a maximum TAC value of 8 being defined or a list of Tracking Area Identity, identified by TAC with associated plmn-Identity per TAC-List containing the PLMN identity for each TAC and a maximum of 8 TAIs being defined.

Example 1. An apparatus comprising: at least one processor; and at least one memory including computer program code; at least one memory and the computer program code configured to, with the at least one processor, cause the apparatus at least to: receive a plurality of channel state information (CSI) values reported by the user device; determine a plurality of estimated reference signal received power (RSRP) values that have been estimated based at least on the plurality of CSI values; and output a sequence of RSRP values, including at least the estimated RSRP values.

Example 2. The apparatus of example 1, the apparatus being further configurated to: receive a plurality of measured RSRP values that were reported by the user device; wherein being configured to determine comprises the apparatus being configured to determine a plurality of estimated RSRP values that have been estimated based at least on the plurality of CSI values reported by the user device and the plurality of measured RSRP values reported by the user device.

Example 3. The apparatus of any of examples 1-2, wherein the apparatus being configured to determine comprises the apparatus being configured to: determine the plurality of estimated RSRP values based on a machine learning model and at least one of the plurality of CSI values reported by the user device and/or the plurality of measured RSRP values reported by the user device.

Example 4. The apparatus of any of examples 1-3, wherein the apparatus being configured to output a sequence comprises the apparatus being configured to: output a sequence of RSRP values that includes both the estimated RSRP values and one or more measured RSRP values that have been measured and reported by the user device.

Example 5. The apparatus of any of examples 1-4 wherein the output sequence of RSRP values comprises a sequence of RSRP values that includes a combination of both the estimated RSRP values and the one or more of measured RSRP values.

Example 6. The apparatus of example 5, wherein the apparatus is further configured to: output a Type indication that indicates, for one or more of the output RSRP values, whether the output RSRP value is a measured RSRP value or an estimated RSRP value.

Example 7. The apparatus of any of examples 1-6 wherein one or more of the plurality of CSI values reported by a user device comprises one or more of: a rank indicator (RI) providing a recommendation on a transmission rank to use, or a number of layers that should be used for downlink communication with the user device; a precoder matrix indicator (PMI) indicating a preferred or suggested precoder to use for downlink communication with the user device; and/or a channel quality indicator (CQI) indicating a highest modulation and coding scheme that is suggested for downlink communication with the user device.

Example 8. The apparatus of example 3, wherein the apparatus is further configured to: receive training information, including a set of measured RSRP values that were measured and reported by the user device and a set of CSI values that were reported by the user device; and train the machine learning model based on the training information.

Example 9. The apparatus of any of examples 1-8, wherein the plurality of CSI values, the plurality of estimated RSRP values, and the sequence of output RSRP values are specific to the user device.

Example 10. The apparatus of any of examples 1-8, wherein the plurality of CSI values, the plurality of estimated RSRP values, and the sequence of output RSRP values are provided for a plurality of user devices.

Example 11. The apparatus of any of examples 3-10, comprising: a machine learning training block configured to train the machine learning model; and a machine learning model RSRP estimation block configured to determine the plurality of estimated RSRP values that are estimated based at least on the plurality of CSI values and the trained machine learning model.

Example 12. The apparatus of example 11, wherein the apparatus comprises a gNB distributed unit (DU) that includes the machine learning training block and the machine learning model RSRP estimation block.

Example 13. The apparatus of example 11, wherein the apparatus comprises a gNB centralized unit (CU) that includes the machine learning training block and the machine learning model RSRP estimation block.

Example 14. The apparatus of example 11, wherein the apparatus comprises a gNB that includes the machine learning training block provided at a centralized unit (CU) of the gNB, and includes the machine learning model RSRP estimation block included at a distributed unit (DU) of the gNB.

Example 15. The apparatus of any of examples 2-11, wherein the apparatus comprises a gNB distributed unit (DU); wherein being configured to receive a plurality of CSI values comprises the DU being configured to receive the plurality of CSI values from the user device; wherein being configured to receive a plurality of measured RSRP values comprises the DU being configured to receive, from a centralized unit (CU) of the gNB, the plurality of RSRP values that were reported by the user device to the CU; and wherein being configured to determine comprises the DU being configured to determine a plurality of estimated RSRP values that have been estimated based at least on the plurality of CSI values reported by the user device to the DU and the plurality of measured RSRP values received by the DU from the CU.

Example 16. The apparatus of any of examples 2-11, wherein the apparatus comprises a gNB centralized unit (CU); wherein being configured to receive a plurality of CSI values comprises the CU being configured to receive, from a distributed unit (DU) of the gNB, the plurality of CSI values that were reported by the user device to the DU; and wherein being configured to receive a plurality of measured RSRP values comprises receiving, by the CU from the user device, the plurality of RSRP values; and wherein being configured to determine comprises the CU being configured to determine a plurality of estimated RSRP values that have been estimated based at least on the plurality of CSI values received by the CU from the DU and the plurality of measured RSRP values reported by the user device to the CU.

Example 17. The apparatus of any of examples 2-11, wherein the apparatus comprises an external unit that is connected to both a centralized unit (CU) and a distributed unit (DU) of a gNB, wherein the external unit is separate or external from a gNB; wherein being configured to receive a plurality of CSI values comprises the external unit being configured to receive, from the DU, the plurality of CSI values that were reported by the user device to the DU; and wherein being configured to receive a plurality of measured RSRP values comprises being configured to receive, by the external unit from the CU, the plurality of RSRP values reported by the user device to the CU; and wherein being configured to determine comprises the external unit being configured to determine a plurality of estimated RSRP values that have been estimated based at least on the plurality of CSI values received by the external unit from the DU and the plurality of measured RSRP values that were received by the external unit from the CU.

Figure 5:
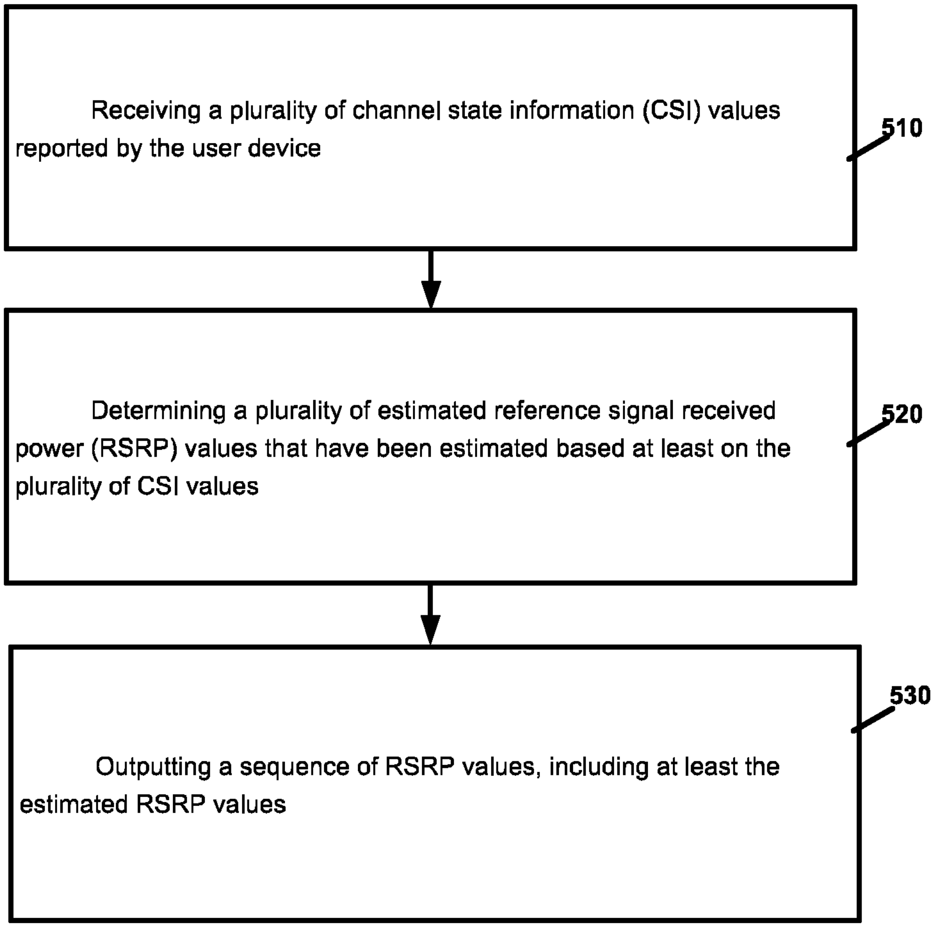
FIG. 5 is a flow chart illustrating operation according to an example embodiment.

Example 18. FIG. 5 is a flow chart illustrating operation according to an example embodiment. Operation 510 includes receiving a plurality of channel state information (CSI) values reported by the user device. Operation 520 includes determining a plurality of estimated reference signal received power (RSRP) values that have been estimated based at least on the plurality of CSI values. And, operation 530 includes outputting a sequence of RSRP values, including at least the estimated RSRP values.

Example 19. The method of example 18, further comprising: receiving a plurality of measured RSRP values that were reported by the user device; and wherein the determining comprises determining a plurality of estimated RSRP values that have been estimated based at least on the plurality of CSI values reported by the user device and the plurality of measured RSRP values reported by the user device.

Example 20. The method of any of examples 18-19, wherein the determining comprises: determining the plurality of estimated RSRP values based on a machine learning model and at least one of the plurality of CSI values reported by the user device and/or the plurality of measured RSRP values reported by the user device.

Example 21. The method of any of examples 18-20, wherein the outputting a sequence comprises: outputting a sequence of RSRP values that includes both the estimated RSRP values and one or more measured RSRP values that have been measured and reported by the user device.

Example 22. The method of any of examples 18-21 wherein the output sequence of RSRP values comprises a sequence of RSRP values that includes a combination of both the estimated RSRP values and the one or more of the measured RSRP values.

Example 23. The method of example 22, further comprising: outputting a Type indication that indicates, for one or more of the output RSRP values, whether the output RSRP value is a measured RSRP value or an estimated RSRP value.

Example 24. The method of any of examples 18-23 wherein one or more of the plurality of CSI values reported by a user device comprises one or more of: a rank indicator (RI) providing a recommendation on a transmission rank to use, or a number of layers that should be used for downlink communication with the user device; a precoder matrix indicator (PMI) indicating a preferred or suggested precoder to use for downlink communication with the user device; and/or a channel quality indicator (CQI) indicating a highest modulation and coding scheme that is suggested for downlink communication with the user device.

Example 25. The method of example 20, further comprising: receiving training information, including a set of measured RSRP values that were measured and reported by the user device and a set of CSI values that were reported by the user device; and training the machine learning model based on the training information.

Example 26. The method of any of examples 18-25, wherein the plurality of CSI values, the plurality of estimated RSRP values, and the sequence of output RSRP values are specific to the user device.

Example 27. The method of any of examples 18-25, wherein the plurality of CSI values, the plurality of estimated RSRP values, and the sequence of output RSRP values are provided for a plurality of user devices.

Example 28. The method of any of examples 20-27, comprising: training the machine learning model; and determining the plurality of estimated RSRP values that are estimated based at least on the plurality of CSI values and the trained machine learning model.

Example 29. An apparatus comprising means for performing the method of any of examples 18-28.

Example 30. A computer program comprising instructions which, when the program is executed by a computer, cause the computer to carry out the method of any of examples 18-28.

Example 31. An apparatus comprising: at least one processor; and at least one memory including computer program code; the at least one memory and the computer program code configured to, with the at least one processor, cause the apparatus at least to perform the method of any of examples 18-28.

Figure 6:
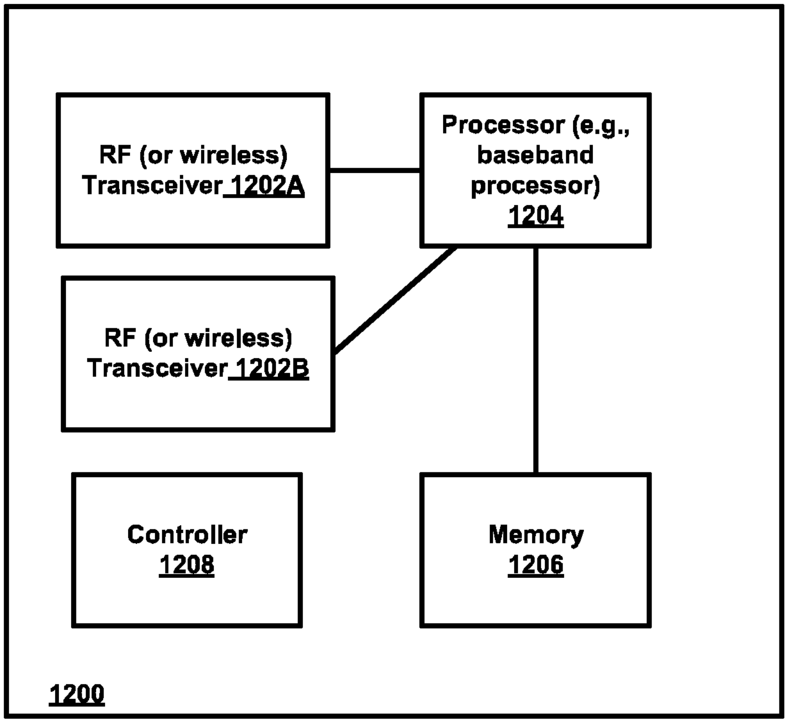
FIG. 6 is a block diagram of a wireless station, network node or wireless node (e.g., AP, BS, RAN node, UE or user device, or other wireless node or network node) according to an example embodiment.

FIG. 6 is a block diagram of a wireless station (e.g., AP, BS or user device/UE, or another network node) 1200 according to an example embodiment. The wireless station 1200 may include, for example, one or more (e.g., two as shown in FIG. 6) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 6, a controller (or processor) 1208 may execute software and instructions, and may provide overall control for the station 1200, and may provide control for other systems not shown in FIG. 6, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:

at least one processor; and at least one memory including computer program code;

the at least one memory and the computer program code configured to, with the at least one processor, cause the apparatus at least to:

receive a plurality of channel state information (CSI) values reported by a user device;

determine a plurality of estimated reference signal received power (RSRP) values that have been estimated based at least on the plurality of CSI values; and output a sequence of RSRP values, including at least the estimated RSRP values, wherein the plurality of CSI values reported by the user device comprises:

a rank indicator (RI) providing a recommendation on a transmission rank to use, or a number of layers that should be used for downlink communication with the user device;

a precoder matrix indicator (PMI) indicating a preferred or suggested precoder to use for downlink communication with the user device; and a channel quality indicator (CQI) indicating a highest modulation and coding scheme that is suggested for downlink communication with the user device, wherein the apparatus is configured to determine the plurality of estimated RSRP values based on a machine learning model that has been trained using a set of measured RSRP values and a set of CQI values to learn a correlation between CQI values and RSRP values.

2. The apparatus of claim 1, the apparatus being further configurated to:

receive a plurality of measured RSRP values that were reported by the user device;

wherein being configured to determine comprises the apparatus being configured to determine a plurality of estimated RSRP values that have been estimated based at least on the plurality of CSI values reported by the user device and the plurality of measured RSRP values reported by the user device.

3. The apparatus of claim 2, wherein the apparatus comprises a gNB distributed unit (DU);

wherein being configured to receive a plurality of CSI values comprises the DU being configured to receive the plurality of CSI values from the user device; and wherein being configured to receive a plurality of measured RSRP values comprises the DU being configured to receive, from a centralized unit (CU) of the gNB, the plurality of RSRP values that were reported by the user device to the CU; and wherein being configured to determine comprises the DU being configured to determine a plurality of estimated RSRP values that have been estimated based at least on the plurality of CSI values reported by the user device to the DU and the plurality of measured RSRP values received by the DU from the CU.

4. The apparatus of claim 2, wherein the apparatus comprises a gNB centralized unit (CU);

wherein being configured to receive a plurality of CSI values comprises the CU being configured to receive, from a distributed unit (DU) of the gNB, the plurality of CSI values that were reported by the user device to the DU; and wherein being configured to receive a plurality of measured RSRP values comprises receiving, by the CU from the user device, the plurality of RSRP values; and wherein being configured to determine comprises the CU being configured to determine a plurality of estimated RSRP values that have been estimated based at least on the plurality of CSI values received by the CU from the DU and the plurality of measured RSRP values reported by the user device to the CU.

5. The apparatus of claim 2, wherein the apparatus comprises an external unit that is connected to both a centralized unit (CU) and a distributed unit (DU) of a gNB, wherein the external unit is separate or external from a gNB; wherein being configured to receive a plurality of CSI values comprises the external unit being configured to receive, from the DU, the plurality of CSI values that were reported by the user device to the DU; and wherein being configured to receive a plurality of measured RSRP values comprises being configured to receive, by the external unit from the CU, the plurality of RSRP values reported by the user device to the CU; and wherein being configured to determine comprises the external unit being configured to determine a plurality of estimated RSRP values that have been estimated based at least on the plurality of CSI values received by the external unit from the DU and the plurality of measured RSRP values that were received by the external unit from the CU.

6. The apparatus of claim 1, wherein the apparatus comprises:

a gNB distributed unit (DU) including a machine learning model RSRP estimation block, wherein the machine learning model RSRP estimation block is configured by a gNB centralized unit (CU) with one or more of: a sampling period, a time interval, or a user equipment transmission/reception mode.

7. The apparatus of claim 1, wherein the apparatus being configured to output a sequence comprises the apparatus being configured to:

output a sequence of RSRP values that includes both the estimated RSRP values and one or more measured RSRP values that have been measured and reported by the user device, wherein the estimated RSRP values are provided in time gaps between successive measured RSRP values in the sequence, and wherein the apparatus is configured to output the sequence of RSRP values as a regularly spaced sequence, wherein a RSRP value is output every predetermined time period.

8. The apparatus of claim 7, wherein:

the set of measured RSRP values used to train the machine learning model comprises RSRP values obtained from Immediate Minimization of Drive Tests (MDT) reports; and the apparatus is configured to activate a Trace Session to collect the MDT reports from a plurality of user devices.

9. The apparatus of claim 1, wherein the machine learning model comprises a supervised learning model or a neural network trained using the set of measured RSRP values and the set of CQI values as training data.

10. The apparatus of claim 1, wherein the apparatus is further configured to:

output a Type indication that indicates, for one or more of the output RSRP values, whether the output RSRP value is a measured RSRP value or an estimated RSRP value.

11. The apparatus of claim 1, wherein the output sequence of RSRP values includes both measured RSRP values and estimated RSRP values, and wherein the estimated RSRP values are provided in time gaps between successive measured RSRP values; and wherein the apparatus is further configured to:

output the sequence of RSRP values as a regularly spaced sequence, wherein a RSRP value is output every predetermined time period;

output a Type indication that indicates, for each RSRP value in the sequence, whether the RSRP value is a measured RSRP value or an estimated RSRP value; and provide the sequence of RSRP values and the Type indication to one or more applications, wherein the one or more applications apply a higher confidence level to measured RSRP values and a lower confidence level to estimated RSRP values based on the Type indication.

12. The apparatus of claim 1, wherein the machine learning model has been trained based on a determined correlation between CQI values and RSRP values, the correlation having a Pearson's correlation coefficient of at least 0.5; and the apparatus is further configured to:

determine an estimation error between one or more estimated RSRP values and one or more subsequently received measured RSRP values; and in response to the estimation error exceeding a threshold, trigger retraining of the machine learning model.

13. The apparatus of claim 1, wherein the plurality of CSI values, the plurality of estimated RSRP values, and the sequence of output RSRP values are specific to the user device.

14. The apparatus of claim 1, wherein the plurality of CSI values, the plurality of estimated RSRP values, and the sequence of output RSRP values are provided for a plurality of user devices.

15. The apparatus of claim 1, comprising:

a machine learning training block configured to train the machine learning model;

a machine learning model RSRP estimation block configured to determine the plurality of estimated RSRP values that are estimated based at least on the plurality of CSI values and the trained machine learning model.

16. The apparatus of claim 15, wherein the apparatus comprises a gNB distributed unit (DU) that includes the machine learning training block and the machine learning model RSRP estimation block.

17. The apparatus of claim 15, wherein the apparatus comprises a gNB centralized unit (CU) that includes the machine learning training block and the machine learning model RSRP estimation block.

18. The apparatus of claim 15, wherein the apparatus comprises a gNB that includes the machine learning training block provided at a centralized unit (CU) of the gNB, and includes the machine learning model RSRP estimation block included at a distributed unit (DU) of the gNB.

19. The apparatus of claim 1, wherein:

the training of the machine learning model is further based on one or more of:

pre-labelled reference RSRP values;

time stamps for the measured RSRP values and the CSI values; or UE context information comprising velocity or mobility state; and the output sequence of RSRP values is provided to one or more applications comprising at least one of:

a radio resource management (RRM) function;

a mobility optimization function for performing cell change or UE handover;

a resource allocation or scheduling function;

a fault detection or failure monitoring function; or a machine learning model for network performance optimization.

20. A method comprising:

receiving a plurality of channel state information (CSI) values reported by a user device;

determining a plurality of estimated reference signal received power (RSRP) values that have been estimated based at least on the plurality of CSI values; and outputting a sequence of RSRP values, including at least the estimated RSRP values, wherein the plurality of CSI values reported by the user device comprises:

a rank indicator (RI) providing a recommendation on a transmission rank to use, or a number of layers that should be used for downlink communication with the user device;

a precoder matrix indicator (PMI) indicating a preferred or suggested precoder to use for downlink communication with the user device; and a channel quality indicator (CQI) indicating a highest modulation and coding scheme that is suggested for downlink communication with the user device, wherein the determining comprises determining the plurality of estimated RSRP values based on a machine learning model that has been trained using a set of measured RSRP values and a set of CQI values to learn a correlation between CQI values and RSRP values.

* * * * *